Patented Oct. 1, 1940

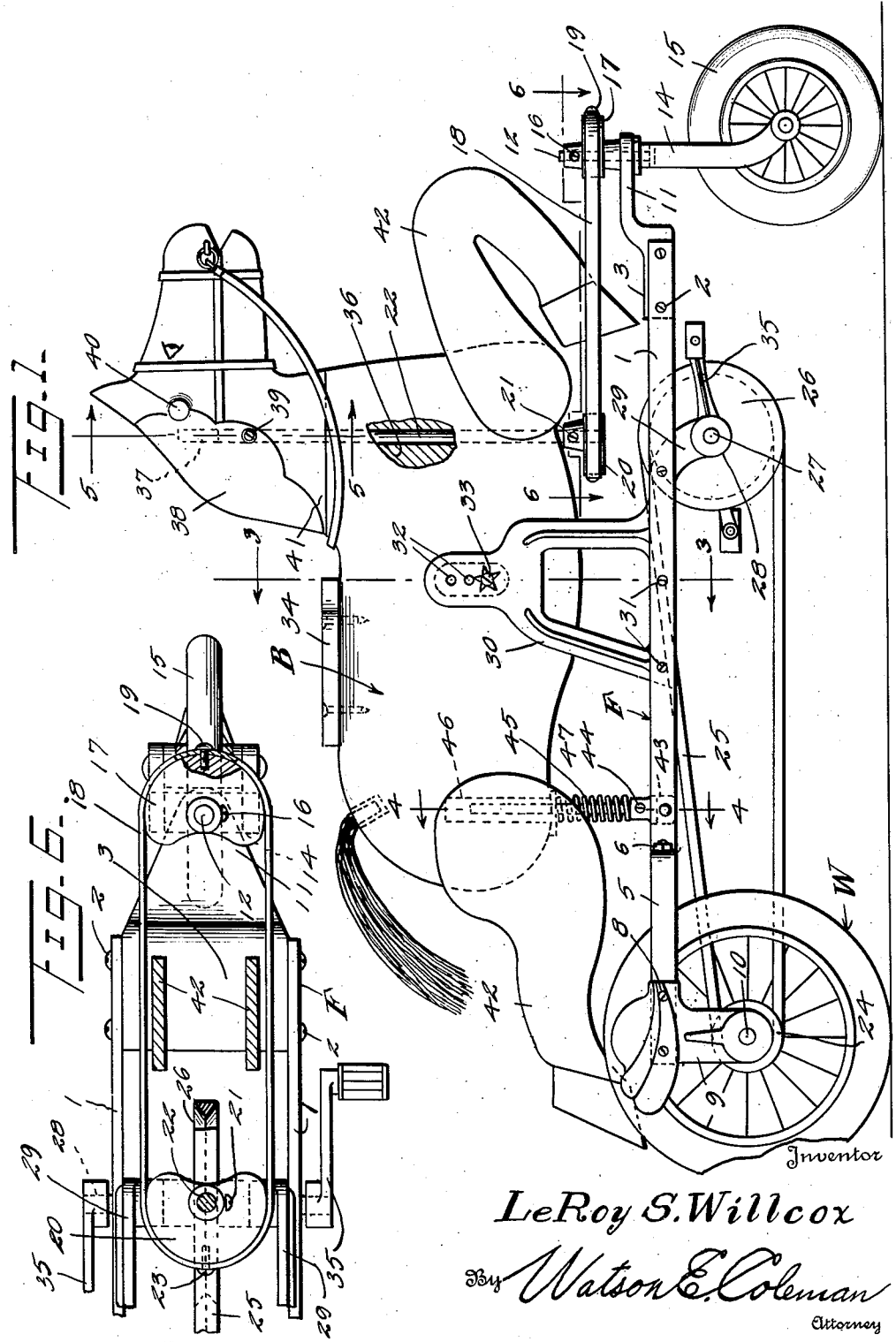

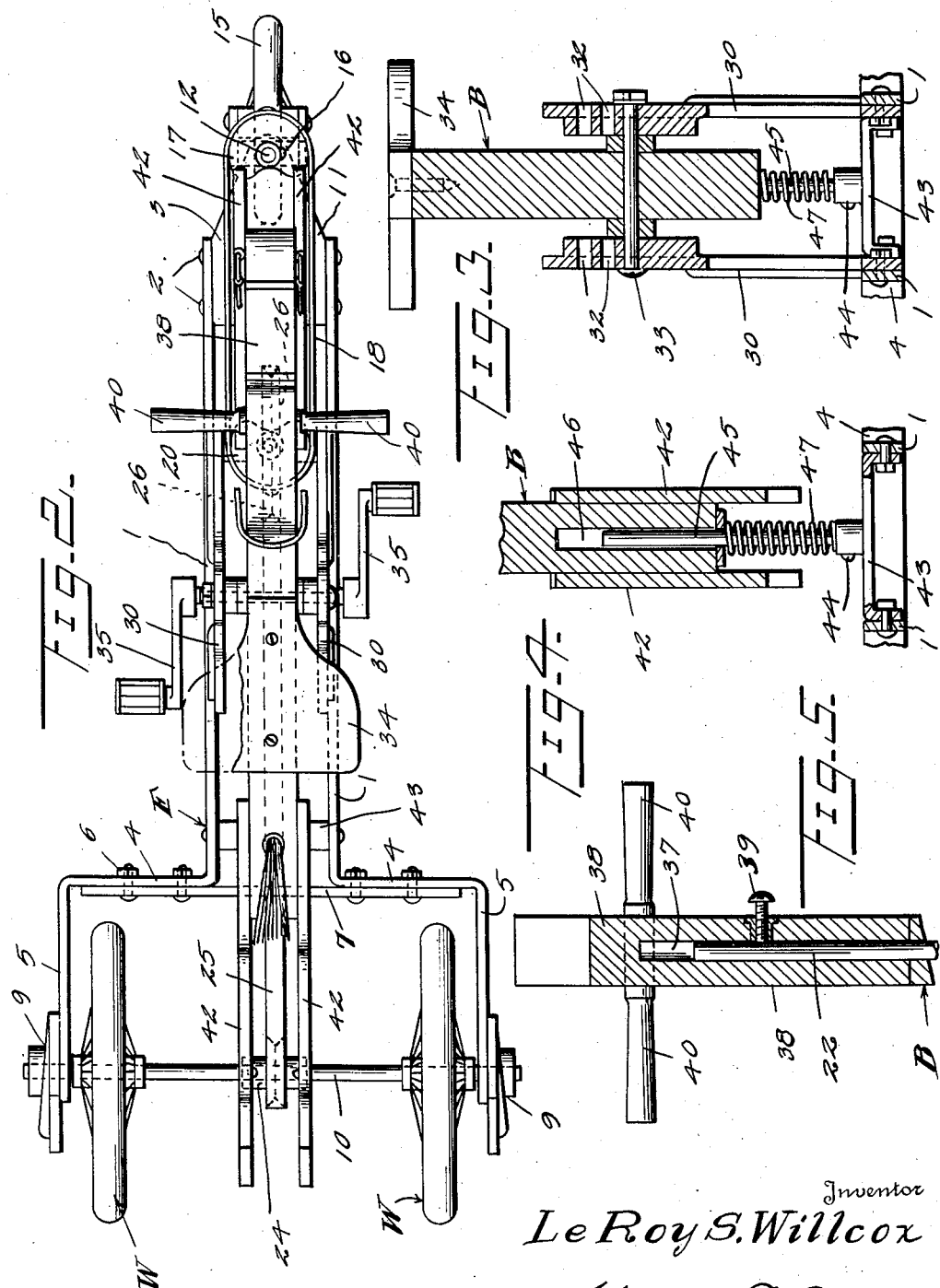

2,216,426

UNITED STATES PATENT OFFICE 2,216,426

VELOCIPEDE

Le Roy Steven Willcox, Piqua, Ohio, assignor of thirty per cent to Clay N. Staley, Piqua, Ohio Application January 11, 1940, Serial No. 313,438

2 Claims. (Cl. 280—1.13)

This invention relates to velocipedes, and it is an object of the invention to provide a device of this kind which is pedal operated and which also includes a body in simulation of a horse or other animal.

The invention also has for an object to provide a vehicle of this kind wherein is comprised a wheeled frame on which is mounted for rocking movement a seat carrying body together with means for yieldingly resisting the rocking of the body in one direction.

Another object of the invention is to provide a vehicle of this kind including a wheeled frame having a steering wheel together with a seat carrying body mounted upon the frame and having means coacting with the steering wheel whereby the direction of travel of the vehicle may be readily controlled by the occupant of the seat carried by the body.

The invention consists in the details of construction and in the combination and arrangement of the several parts of my improved velocipede whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view partly in side elevation and partly in section of a velocipede or kindred vehicle constructed in accordance with an embodiment of my invention;

Figure 2 is a view in top plan of the device as illustrated in Figure 1;

Figure 3 is a fragmentary detailed sectional view taken substantially on the line 3—3 of Figure 1;

Figure 4 is a fragmentary detailed sectional view taken substantially on the line 4—4 of Figure 1;

Figure 5 is a fragmentary detailed sectional view taken substantially on the line 5—5 of Figure 1;

Figure 6 is a detailed fragmentary sectional view taken substantially on the line 6—6 of Figure 1.

As disclosed in the accompanying drawings, F denotes a frame of desired dimensions and which includes two elongated front parallel side members 1 spaced apart a desired distance. The forward end portions of these members 1 are riveted or otherwise suitably anchored, as at 2, to an interposed block 3 which maintains the forward end portions of these members 1 in desired spaced relation. The rear extremities of the members 1 are continued by the perpendicularly related and outwardly directed arms 4 of desired length and terminating in the rearwardly directed parallel arms 5. The arms 4 have bolted, as at 6, or otherwise secured thereto the end portions of a bar 7 which bridges the space between the rear ends of the members 1 and provide means for maintaining said rear extremities of the members 1 in desired spaced relation.

The outer or free end portions of the arms 5 have suitably secured thereto, as at 8, the depending bearing members 9 which rotatably support a rear driving shaft or axle 10. This shaft or axle 10 has fixed to its opposite end portions inwardly of but in close proximity to the arms 5 the drive wheels W. These wheels may be of any type desired.

The block 3 hereinbefore referred to is provided with an upwardly offset and forwardly directed table 11 through which is freely directed from below the shank 12 of a steering fork 14. The mounting for the shank 12 of the fork 14 is at substantially the transverse center of the frame F and said fork carries a conventional ground engaging wheel 15.

Fixed to the shank 12 by a screw 16 or the like is a head 17 parti-circular in plan with its curved face forwardly directed. Extending over the forward curved edge face of the head 17 is an endless flexible member or belt 18. This belt 18 is held to the head 17 by a suitable fastening element 19 herein disclosed as a screw extending through the belt 18 and threading within the curved edge face of the head 17 midway the ends of said curved face.

This belt 18 also extends around a head 20 of the same configuration and dimensions as the head 17 and which head 20 is held by the screw 21 or the like to the lower end portion of a vertically disposed steering rod 22.

The rounded edge face of the head 20 is rearwardly directed and the belt 18 is fixed to said head 20 midway the ends of the curved edge face by the screw 23 or its equivalent.

The drive shaft or axle 10 at substantially the transverse center of the frame F has fixed thereto for rotation therewith a pulley 24 with which operatively engages an endless driving element or belt 25 which is also operatively engaged around a pulley 26 fixed to rotate with a shaft 27. The shaft 27 underlies the frame F and extends transversely thereacross with each end portion of said shaft 27 rotatably engaged with a bearing 28 carried by the lower portion of a forwardly and downwardly curved arm 29 formed with the lower forward portion of a bracket 30.

A bracket 30 is carried by and extends upwardly from the central portion of each of the members 1 of the frame F and said bracket 30, as herein disclosed, has its lower portion secured to its associated member 1 by the screws 31 although, of course, the bracket may be rigidly secured to the member 1 in any manner preferred. The bracket 30 is of desired dimensions and has its upper portion provided with a series of spaced openings 32 extending lengthwise of the bracket and through which is adapted to be selectively inserted a pivot bolt 33.

As is clearly illustrated in Figure 2, the brackets 30 are in alignment transversely of the frame F and the pivot bolt or member 33 bridges the space therebetween to provide a support for the body B which, as herein disclosed, is in simulation of a horse. I do not, however, wish to be understood as limiting myself to this particular design as this body B may be of other simulations.

The pivot bolt or member 33 is freely disposed through the body B at the desired location intermediate the ends thereof whereby the body B is supported for rocking movement. The spaced openings 32 allow within certain limitations an adjustment of the body B toward or from the frame F in accordance with the size of the child using the vehicle so that the child occupying the seat 34 carried by the upper part of the body B may best engage and operate the pedal cranks 35 carried by the opposite end portions of the shaft 27 and at points outwardly from the opposite sides of the frame F.

In the present embodiment of my invention the body B is cut from a board of desired thickness and is provided at its forward extremity with a bore 36 disposed between the side faces of the body B and through which the steering rod 22 hereinbefore referred to is freely directed. This steering rod 22 is of a length to extend upwardly within an elongated socket 37 extending upwardly within a steering member 38 herein disclosed as in simulation of the head of a horse. The member 38, as herein disclosed, is fixed to the portion of the rod 22 within the socket 37 by the binding screw 39 whereby the member 38 and the rod 22 will rotate in unison. It is to be noted that the socket 37 is of a depth to readily allow adjustment of the rod 22 within the socket 37 to compensate for the selective adjustment of the body B with respect to the frame F as afforded by the openings 32 of the brackets 30.

The member 38 as particularly illustrated in Figures 1 and 2 is provided at a suitable location thereon with the oppositely directed handle members 40 which can be readily grasped by the child occupying the seat 34 and which also provide means to permit the turning of the member 38 to effect the desired steering of the vehicle.

As illustrated in Figure 1, the lower margin of the member 38 is straight and the adjacent margin of the body B is also straight as indicated at 41, said straight margins being perpendicularly related to the applied steering rod 22.

The opposite end portions of the body B have secured to the opposite faces thereof the leg members 42 herein disclosed as in imitation of a charging steed. These leg members 42 are preferably adhesively secured to the side faces of the body B and are cut from wood. This assembly permits the complete body B to be produced with slight cost as the body B proper together with the member 38 and the legs 42 may be readily cut out with a band saw or the like. While I have found that the legs 42 may be effectively held to the body B by glue, yet if desired other means may be employed for securing said leg members 42 in position.

The rear portions of the members 1 of the frame F have interposed therebetween and suitably secured thereto a cross member or brace 43. This member 43 immediately below the rear part of the body B has rigidly secured thereto, as at 44, the lower end portion of a rod 45. This rod 45 is of a length to extend within a socket 46 provided in the lower edge face of the body B at the rear thereof. This socket 46 is elongated, as indicated in Figure 1, in order to offer no hinderance or resistance to the rocking or oscillating movement of the body B. Surrounding the rod 45 and interposed between the member 43 and the under edge face of the body B is a cushioning spring 47. This spring 47 serves to absorb the shocks and jars incident to the use of the vehicle and which might otherwise be inconvenient to the occupant of the seat 34. In other words, the spring 47 gives to the occupant of the seat 34 the same benefits as if the seat 34 was of a spring or cushion type.

From the foregoing description it is thought to be obvious that a velocipede constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A vehicle of the class described comprising a frame, ground engaging wheels carried thereby, transversely spaced brackets carried by the frame and extending upwardly therefrom, said brackets having downwardly disposed bearing arms, a pedal operated shaft rotatably supported by said bearing arms, a driving connection between said pedal operated shaft and certain of the ground engaging wheels, and a seat carrying body supported by and between the brackets for rocking movement.

2. A vehicle of the class described comprising a frame, ground engaging wheels carried thereby, transversely spaced brackets carried by the frame and extending upwardly therefrom, said brackets having downwardly disposed bearing arms, a pedal operated shaft rotatably supported by said bearing arms, a driving connection between said pedal operated shaft and certain of the ground engaging wheels, a seat carrying body, and means coacting with said brackets and the body for supporting the body for rocking movement, said means being so constructed and arranged to allow selective adjustment of the body toward or from the frame.

LE ROY STEVEN WILLCOX.